(12) United States Patent
Lefeber

(10) Patent No.: US 11,982,759 B2
(45) Date of Patent: May 14, 2024

(54) SYSTEM FOR DETERMINING THE POSITION OF PERSONS ON A FLOOR

(71) Applicant: CONNECTIVE FLOORS B.V., BC Eindhoven (NL)

(72) Inventor: Frans Jan Lefeber, BC Eindhoven (NL)

(73) Assignee: CONNECTIVE FLOORS B.V., Eindhoven (NL)

(*) Notice: Subject to any disclaimer, the term of this patent is extended or adjusted under 35 U.S.C. 154(b) by 61 days.

(21) Appl. No.: 16/349,599

(22) PCT Filed: Nov. 6, 2017

(86) PCT No.: PCT/NL2017/050714
§ 371 (c)(1),
(2) Date: May 13, 2019

(87) PCT Pub. No.: WO2018/088894
PCT Pub. Date: May 17, 2018

(65) Prior Publication Data
US 2019/0271760 A1    Sep. 5, 2019

(30) Foreign Application Priority Data
Nov. 14, 2016   (NL) .................................. 1042143

(51) Int. Cl.
G01S 5/08       (2006.01)
G01S 5/14       (2006.01)
(Continued)

(52) U.S. Cl.
CPC ............... G01S 5/08 (2013.01); G01S 5/14 (2013.01); G01S 11/06 (2013.01); G01S 13/751 (2013.01);
(Continued)

(58) Field of Classification Search
CPC ..... G01S 5/08; G01S 5/02; G01S 5/14; G01S 11/06; G01S 13/751; G06K 7/10386; G06K 19/0723
(Continued)

(56) References Cited

U.S. PATENT DOCUMENTS 7,038,573 B2 * 5/2006 Bann ..................... B66F 9/0755
                                                      340/10.52
2009/0231142 A1 * 9/2009 Nikitin ................. G06K 7/0008
                                                      340/572.8
(Continued)

*Primary Examiner* — Michael G Lee
*Assistant Examiner* — David Tardif
(74) *Attorney, Agent, or Firm* — FisherBroyles, LLP; Robert Kinberg

(57) ABSTRACT

System for detecting a person on an underground, which is provided with passive RFID tags (1) in a predetermined pattern, while the person is provided with a sensor module (2), which is adapted to determine the position thereof relative with respect of to the RFID tags and, preferably, the direction and/or the acceleration and/or the inclination thereof. The sensor module and/or further processing means are arranged to calculate the position of the sensor module by means of triangulation calculation. The tag pattern is formed by a regular pattern of tag clusters (4), each being formed by two tag strips, oriented in a T-shape with respect to each other. Of the T-shaped clusters, the first tag strip has an even identification code and the other tag strip has an odd Identification code. The RFID tags are applied to construction foil, which is positioned under the top layer of a floor.

8 Claims, 3 Drawing Sheets

(51) Int. Cl.
  *G01S 11/06*    (2006.01)
  *G01S 13/75*    (2006.01)
  *G06K 7/10*     (2006.01)
  *G06K 19/07*    (2006.01)
  *G06K 19/077*   (2006.01)

(52) U.S. Cl.
  CPC ..... *G06K 7/10386* (2013.01); *G06K 19/0723* (2013.01); *G06K 19/07786* (2013.01)

(58) Field of Classification Search
  USPC .......................................................... 342/464
  See application file for complete search history.

(56) References Cited

U.S. PATENT DOCUMENTS

| | | | | |
|---|---|---|---|---|
| 2012/0286999 | A1* | 11/2012 | Haimerl | G01S 5/0252 342/464 |
| 2014/0152507 | A1* | 6/2014 | McAllister | G06K 7/10376 342/126 |
| 2015/0165142 | A1* | 6/2015 | Tham | A61M 16/0051 128/202.22 |

* cited by examiner

SYSTEM FOR DETERMINING THE POSITION OF PERSONS ON A FLOOR

PRIORITY APPLICATIONS

This application is a U.S. National Stage Filing under 35 U.S.C. 371 from International Application No. PCT/NL2017/050714, filed on 6 Nov. 2017 and published as WO 2018/088894 on 17 May 2018, which claims the benefit of priority to Netherlands Patent Application No. 1042143 filed 14 Nov. 2016, which applications and publication are incorporated herein by referenced in their entirety.

The invention relates to a system for determining the position of persons on a floor, for example of athletes in indoor and outdoor sports environments on an indoor or outdoor sports floor or wall, but also for determining the position of, for example, elder people in a more or less protected environment such as a nursing home.

According to the invention, a system is provided for detecting a person on an underground (or optionally against a background, for example for the purpose of pursuing an indoor climbing sport), the system comprising passive RFID tags, which are provided in a predetermined pattern upon or within the underground, and wherein the person is provided with a sensor module, which is adapted to determine the position of the sensor module with respect to the RFID tags.

Sensing of persons or objects by means of RFID tags is generally known; see for example https://en.wikipedia.org/wiki/Radio-frequency_identification. In particular, the present invention aims to provide such a system for athletes in indoor and outdoor sports environments on any type of indoor and outdoor sports floor. Since not only the position of the athlete is important, but also its direction, the acceleration and/or the inclination of certain parts of the athlete's body, according to the invention, preferably the sensor module, which is attached for example to one foot or two feet of the athletes, is also able to determine the (moving) direction (in particular the direction with respect to the direction of the earth's magnetic field) and/or the (movement) acceleration and/or the inclination (in particular the inclination with respect to the direction of the earth's gravity).

The (mobile) sensor module is preferably adapted to store and/or process data by means of internal or external means, which data provide an indication of the position, the direction and/or the acceleration and/or the inclination of the sensor module. The sensor module and/or the processing means are preferably arranged to accurately calculate the position of the sensor module by means of a triangulation calculation.

Preferably, the predetermined pattern of the RFID tags is formed by a regular pattern of clusters, each cluster comprising more than one RFID tag. For example, each cluster comprises at least two elongated tag strips, wherein each tag strip comprises one or more RFID tags, which tag strips extend at a certain mutual angle with respect to each other.

Technically, it appears to be very advantageous to form each cluster by two tag strips, which are arranged in a T-shape with respect to each other. Preferably, each RFID tag has a numerical identification code; the first tag strip of the T-shaped clusters comprises one or more RFID tags having an identification code with an even numerical value, and the RFID tags of the other tag strip have an identification code with an odd numerical value.

Preferably, the RFID tags are applied on or in a foil, which is intended and arranged to be covered by a top layer (cover layer) as an underlay or intermediate layer of a floor or wall (for example a clamber wall). For example, as appears from http://www.rfidtags.com/passive-rfid-tags, passive RFID tags are often implemented as stickers. Such tag stickers can be applied, for example, as T-shaped clusters on construction foil, which may serve as an underlay or intermediate layer for a floor, on which athletes etc. can move, while their movements, using the "RFID tag underlay" and the RFID sensor module(s) and the suitable data processing means arranged on the athlete(s), can be sensed and analyzed, for example to improve their sporting performance.

The invention will now be described in more detail by means of the figure description hereinafter.

A person carries a sensor module on or in the left and/or right shoe, or on the left and/or right ankle, or on the left and/or right lower leg. Depending on the requirements, the position and orientation of one foot or both feet can be measured. When someone walks, runs or jumps over a floor with this sensor module, it is possible to precisely measure the position (approximately 3-5 cm accurate), the orientation, the speed and the acceleration of the feet. This is possible because an "underfloor" is installed under the "top floor" (top layer). This "underfloor" consists of a construction foil in which passive RFID tags are placed in a specific manner.

The system comprises: a large number of RFID tags, which are applied against a (under) foil below the floor surface; one or more portable sensor modules per person; internal and/or external hardware and software required for internal processing (within the sensor module) and/or for external processing (by processing means outside the sensor module, to which the data are transferred via wireless data transmission). With this system the position of each portable sensor module is determined and preferably also the direction of movement (orientation) and/or the acceleration and/or the inclination (position) of the sensor module.

Use is being made of passive RFID tags, which are adhered in a typical T shape on building/construction foil (see FIG. 1), the even-numbered tags are horizontal and the odd numbered tags are vertical or vice versa.

This method of tagging makes it possible, in combination with the RSSI values (Received Signal Strength Indicator=indication of the strength, expressed in dBm, of the reflected signal from the RFID tag being received by the portable sensor module) of the even and odd tags, to use different triangulation calculations to determine the final position and orientation of the portable sensor module and thereby of the feet on which the sensor modules are attached. For example, forty-six tags were affixed onto the foil per $m^2$, twenty-three with an even ID code and twenty-three with an odd ID code, i.e. twenty-three T-shaped clusters per $m^2$. As a result the final position of the portable sensor module can be accurately measured at 3-5 cm.

Figure 1:
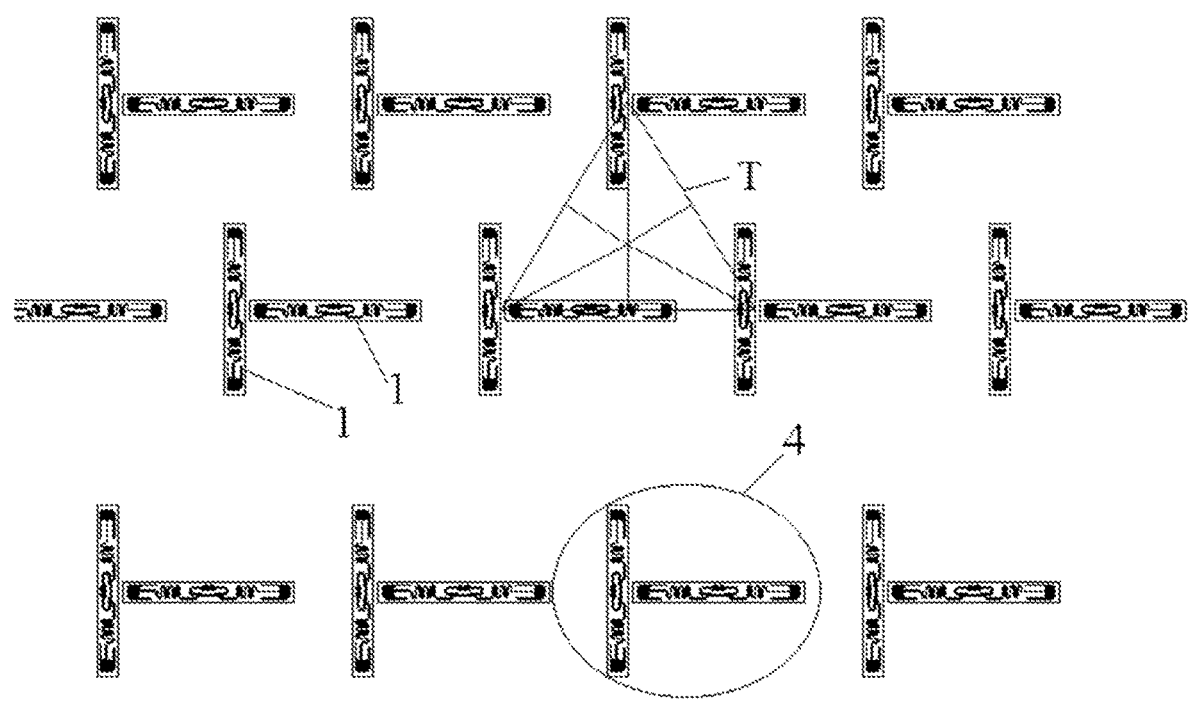
FIG. 1 shows a preferred pattern of RFID tags, which are applied to an underground, for example a piece of construction foil to be used as an underlay or intermediate layer, including a drawn-in triangle for a triangulation calculation.

Triangulation (https://en.wikipedia.org/wiki/Triangulation) is the ability to calculate different points within a triangle, when the length of a side and the angle between two corner points are known. With this information a triangle can be constructed. With a complete triangle, points can be calculated within the triangle with a higher accuracy. So, when is ensured, that the RFID tags are alternately affixed as shown in FIG. 1, the calculation software is able to calculate triangles between all T-shaped clusters.

Figure 2:
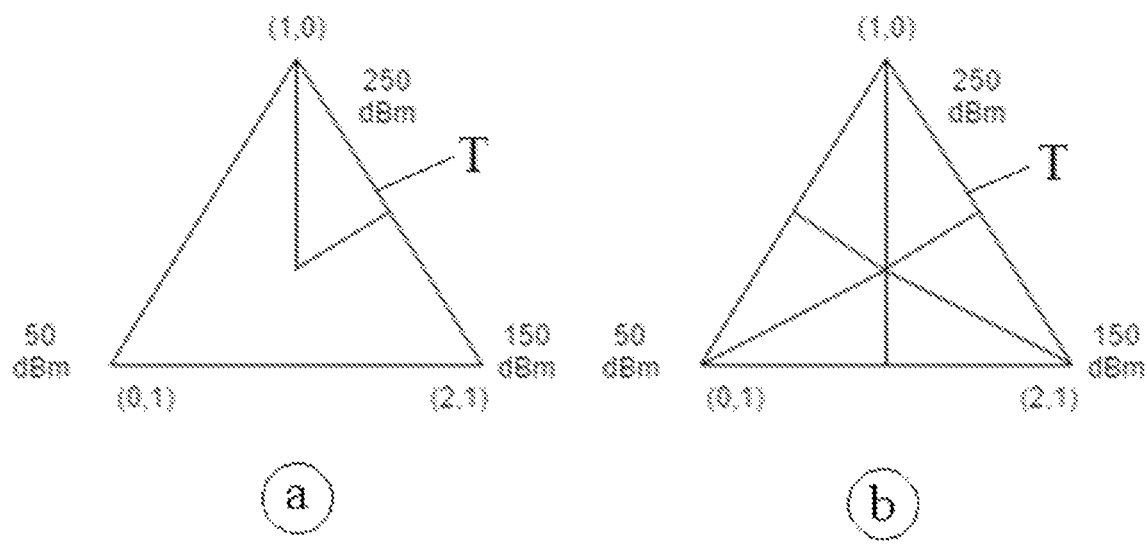
FIG. 2 illustrates a triangulation calculation.

Because the positions of all T-shaped clusters are known a priori, and as a result all RFID tags that are associated, the software can calculate more points by means of triangulation. First, the X and Y coordinates of the three T-shaped clusters are determined and then the centre of the triangle, namely by adding together the X coordinates and the Y coordinates and dividing the results by three, from which the coordinates of the centre M result. This centre point M is then used for the new triangle. For the second point of the new triangle, the software must consider the RSSI values of the relevant RFID tags. For this purpose, the X and Y coordinates are used of the two points having the strongest RSSI value, from which the centre is calculated. This will be in the middle of the line that connects the two points. For the last point of the smaller triangle, the coordinates of the RFID tag with the strongest RSSI value are used. The effect of the triangulation can be seen in FIGS. 2a and 2b. In this way, the large triangle could be divided into six planes.

In the above-described manner, the software can, on the basis of the predetermined pattern of the RFID tags and the RSSI values of the passive RFID tags (which are "beamed" by the active sensor module) measured by the sensor module(s), perform anywhere on the floor an accurate determination of the position of the sensor module (s), and thus of the (limbs of) of the athletes.

The mobile sensor module is designed in such a way, that communication with tags can take place through any floor surface, with the exception of metal. The floor surface has no surface area limit. The system according to the invention has already been tested on the following floors:
Wood of 5 cm thick
Wood with a cast floor
Wood with carpet
Wood with linoleum
Wood with an artificial turf on top of it, as is used in hockey and football
Wood with a real grass lawn on top it, as used in football.
Stone tiles 3-4 cm thick
If water is left on the "top floor", this does not pose a problem for proper operation; due to perforations in the construction foil, the water can run to deeper ground layers.

In addition to the position of the sensor module, a digital compass and an acceleration sensor present in the sensor module also measure the orientation and acceleration of the portable sensor module. The portable sensor module, as shown in FIG. 3, can sent the measured and the optionally (pre)processed data via Wi-Fi to e.g. the cloud (network), after which the data (or calculation, visualization and/or analysis thereof) can be displayed in real-time with a mobile app via pc, tablet, smart phone.

In summary, the invention comprises a system for detecting a person on an underground that is provided with passive RFID tags 1, which tags are provided therein or thereupon in a predetermined known pattern, while the person is provided with a sensor module 2 which is arranged to determine the position of the sensor module relative to the RFID tags 1. The sensor module 2 is furthermore arranged to determine the direction and/or the acceleration and/or the inclination of the sensor module, which is shown in FIG. 3 as module 3 in the sensor module 2. The sensor module 2 is arranged for storing and/or processing (including visualization) of data by means of the internal means, or external means, for example via a network/cloud. The data provide an indication of the position, direction and/or acceleration and/or inclination of the sensor module. The sensor module 2 and/or the internal or external processing means are arranged to calculate the position of the sensor module by means of triangulation calculation, see the triangle T in the FIGS. 1, 2a and 2b.

The predetermined pattern of the RFID tags 1 is preferably formed by a regular pattern of clusters 4, each comprising more than one RFID tag 1 (two tags in the exemplary embodiment shown). The regular pattern is formed by clusters 4, each cluster comprising (at least) two elongated tag strips, each tag strip with (at least) one RFID tag 1, which tag strips extend at an angle of 90° to each other and which preferably are placed/oriented in a T-shape with respect to each other. Each RFID tag has (or is factory-set or is initially set by a programmer, for example) a numerical identification code. The RFID tag of the first tag strip of the T-shaped clusters 4 has an identification code with an even numerical value, and the RFID tag of the other tag strip has an identification code with an odd numerical value. The RFID tags are applied to (or in) a foil that is intended and arranged to be covered by a top layer.

Figure 3:
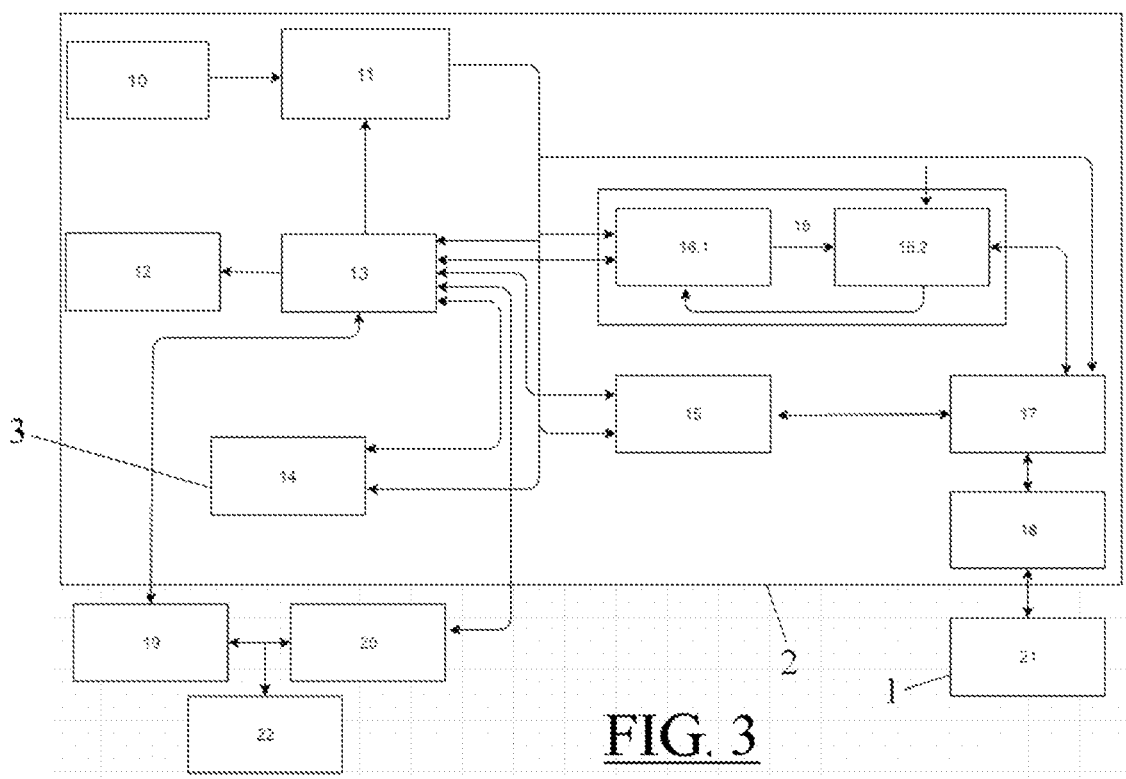
FIG. 3 shows an embodiment of a diagram of a sensor module.

Finally, the components list that belongs to FIG. 3 is shown below.

| Component # | Description |
| --- | --- |
| 10 | Battery 3.7 Vdc |
| 11 | Reverse Voltage protection, Over-Voltage protection |
| 12 | Debugging LED(RGB) |
| 13 | PIC32 |
| 14 | Compass/accelerometer/gyroscope module |
| 15 | UHF Communication module |
| 16 | UHF RFID module(internal amplifier) |
| 16.1 | UHF RFID reader |
| 16.2 | Smart Tuning RF circuit |
| 17 | UHF 2 to 1 Analogue Multiplexer |
| 18 | UHF Antenna |
| 19 | Debugging UARTS Reader |
| 20 | Debugging SPI reader |
| 21 | UFH Class 1 Gen 2 Tag |
| 22 | Software Developer PC |

The invention claimed is:

1. A system for detecting a position of a limb of a person on a floor or a wall, the system comprising:
   a plurality of passive RFID tags arranged upon or within a background of a surface of the floor or the wall and arranged in a predetermined pattern of clusters mutually spaced apart from one another, wherein each cluster includes first and second elongated strips arranged in a T-shape with each elongated strip having one or more RFID tags that each emit a signal that includes a code to identify the first or second elongated strip of the T-shaped cluster on which the RFID tag is located; and
   a sensor module configured to be arranged on the limb of the person and to calculate or facilitate calculation of the position of the limb of the person on the floor or the wall as a function of the predetermined pattern of the clusters containing the RFID tags and parameters of the RFID tag signals including the code in each signal received by the sensor module from the RFID tags.

2. The system according to claim 1, wherein the sensor module on the limp of the person is configured to calculate or facilitate calculation of at least one of a direction, acceleration and inclination of the limb of the person containing the sensor module relative to the floor or wall.

3. The system according to claim 2, wherein the sensor module is configured to at least one of store and process data by one of internal and external means to provide an indication of the at least one of the position, direction, acceleration and the inclination of the sensor module.

4. The system according to claim 3, wherein the one of the internal and external means of the sensor module is arranged to process the data by a triangulation calculation.

5. The system according to claim 2, wherein the code in each signal emitted by the one or more RFID tag(s) on the first strip of each T-shaped cluster comprises is a numerical identification code with an even numerical value and the code in each signal emitted by the one or more RFID tag(s) on the second strip of each T-shaped cluster is a numerical identification code with an odd numerical value, wherein the parameters of the received RFID signals, used by the sensor module in combination with the predetermined pattern of the clusters containing the RFID tags to calculate at least one of the position, direction, acceleration and angle of inclination of the limb of the person on the floor or wall, include a strength of the received RFID signal and the numerical value of the numerical identification code of the received RFID signal.

6. The system according to claim 1, further comprising a foil on or in which the RFID tags are applied and a top layer covering the foil.

7. The system according to claim 1, wherein the sensor module is configured to utilize signals from the RFID tags of at least three adjacent T-shaped clusters to determine or to facilitate determination of the position of the person on the floor or wall.

8. The system of claim 1, wherein the predetermined pattern of clusters includes a plurality of rows, one above the other, of spaced apart clusters, with all the clusters in the predetermined pattern being equally spaced apart in the rows, with each one of the rows being offset with respect to the clusters in a rows that are above and below the one row by half the spacing between two adjacent clusters in a row.

* * * * *